July 9, 1940.	G. SCHOETTINGER ET AL	2,207,599
VALVE OPERATING MECHANISM
Filed March 6, 1939
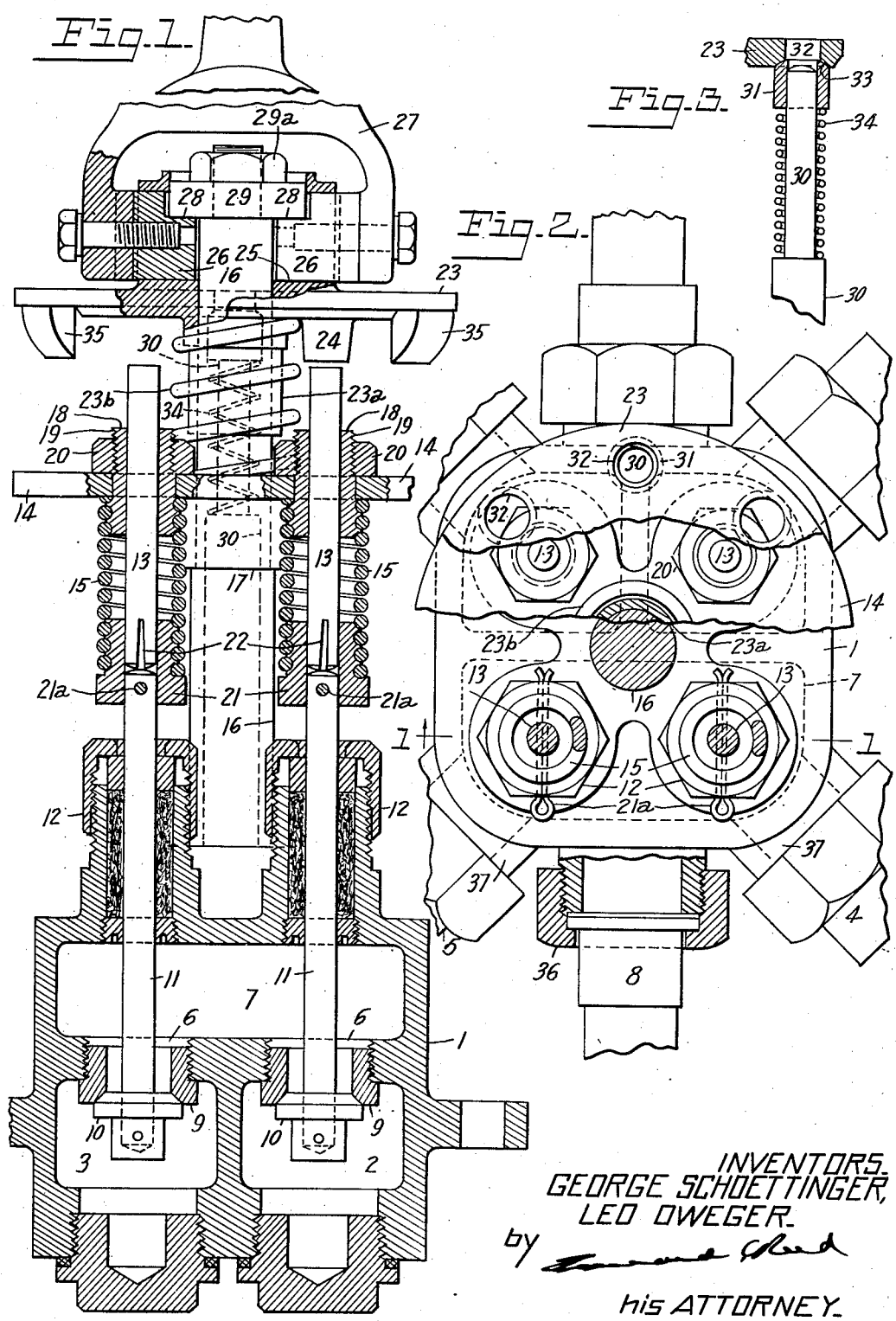
INVENTORS
GEORGE SCHOETTINGER,
LEO OWEGER.
by
his ATTORNEY.

Patented July 9, 1940

2,207,599

UNITED STATES PATENT OFFICE 2,207,599

VALVE OPERATING MECHANISM

George Schoettinger and Leo Oweger, Dayton, Ohio, assignors to The Multiple Valve & Manufacturing Company, Dayton, Ohio, a corporation of Ohio Application March 6, 1939, Serial No. 259,958

11 Claims. (Cl. 277—20)

This invention relates to valve operating mechanism and more particularly to operating mechanism for a valve through which fluids having radically different temperatures are passed in rapid succession. In such a valve the valve members are usually held to their seats by springs and when these springs are subjected in rapid succession to radically different temperatures they tend to deteriorate or crystallize in such a manner that they break after an unduly short period of service. In Patent No. 1,756,845, granted April 29, 1930, to Aufuldish, and in Patent No. 1,788,586, granted January 13, 1931, to Schoettinger and Oweger, there are shown multiple valves designed primarily for alternately admitting live steam and cold water to a press or mold such as is commonly used for molding Bakelite and like substances. In the Aufuldish patent the valve springs were arranged in the valve chambers and were subjected to the full effect of the different temperatures of the fluids passing through the valve. In the Schoettinger and Oweger patent the valve springs were arranged in cavities in the walls of the valve chambers so that they were not directly in the path of the fluids passing through the valve but nevertheless they were seriously affected by the changing temperatures of the different fluids and tended to break after a relatively short period of service, even though very heavy springs were used.

One object of the invention is to provide an operating mechanism for such a valve in which the valve springs will not be adversely affected by the temperatures of the fluids passing through the valve.

To this end it is a further object of the invention to provide an operating mechanism in which the valve springs may be arranged entirely outside of the valve casing.

A further object of the invention is to provide a valve operating mechanism in which tension springs may be utilized for seating the valves instead of the usual compression springs.

A further object of the invention is to provide such an operating mechanism which will be simple in construction and will not interfere with the ordinary use of the valve.

Other objects of the invention may appear as the mechanism is described in detail.

In the accompanying drawing Fig. 1 is a vertical section taken through a valve embodying my invention, on the line 1—1 of Fig. 2; Fig. 2 is a plan view, partly broken away, of such a valve; and Fig. 3 is a detail view of the indexing device.

In the drawing we have illustrated one embodiment of our invention and have shown the same as applied to a multiple valve of the type shown in the aforesaid patent to Schoettinger and Oweger but it will be understood that the mechanism may take various forms and may be applied to valves of different types.

In that embodiment of the invention here illustrated the valve comprises a casing 1 in which are formed a plurality of valve chambers, each valve chamber being provided with an individual valve to control the flow of fluid through the same. The particular arrangement of the valve chambers forms no part of the present invention and need not be here shown or described in detail but it corresponds substantially to the construction and arrangement shown in the aforesaid Aufuldish patent. The present valve utilizes four separate valve members to control the flow of the fluids through the same and in Fig. 1 there is shown a steam inlet valve chamber 2 and a water inlet valve chamber 3 which are connected respectively, by conduits 4 and 5, with suitable sources of supply for live steam and for water. The valve chambers 2 and 3 are connected through ports 6 with an outlet chamber 7 which in turn is connected by a conduit 8 with the press or other device to which steam and water are to be applied. The ports 6 of the valve chambers 2 and 3 are provided with valve seats which are preferably formed on bushings 9 separate from and detachably secured to the body of the casing 1, so that the valve seats may be made of any suitable material and can be readily removed and replaced. Cooperating with each valve seat 9 is a valve member 10 with which is connected a valve stem which extends through and beyond the wall of the valve casing 1. The term "valve casing" is herein used to designate that part of the structure in which the valve chambers are formed and it is not intended to include any extension or supplemental casing which may be provided to enclose the operating mechanism. In the particular construction illustrated each valve stem is formed in two parts, an inner part 11 being secured to the valve member 10 and extending through a packing gland 12, and an outer part 13 being operatively but detachably connected with the inner part of the stem. The two part valve stem is preferred because it facilitates assembling and disassembling the operating mechanism, as will be hereinafter described, but it is not essential to the operation of the apparatus and each valve stem may, if desired, be formed in one continuous piece.

Arranged beyond the valve casing 1 and in spaced relation thereto is a supporting member 14 which is preferably fixed with relation to the valve casing. Arranged between the supporting member 14 and the valve casing 1 are springs 15, there being a separate spring for each valve stem and these springs being connected at their outer ends with the supporting member 14 and at their inner ends with the valve stems and serving to seat the respective valve members 10. The arrangement shown permits of the use of tension springs for this purpose instead of the usual compression springs, and the springs are, of course, arranged in such a position that they will not be affected by the fluids passed through the valve casing. The supporting member 14 may be of any suitable character and may be mounted in proper relation to the valve stems in any suitable manner but is here shown as a circular plate mounted about an elongate stud 16 which is rigidly secured to and extends upwardly from the central part of the valve casing between the packing glands. This stud extends through the supporting member or plate and the latter is preferably provided with a hub 17 by means of which it is supported on the stud.

Springs 15 may be connected with the supporting member 14 in any suitable manner and, in the arrangement shown, the supporting member is provided with a plurality of guide elements through which the valve stems extend and which may also be utilized for connecting the springs with the supporting member. It is preferable, particularly when a two part valve stem is used, that the valve stems should have snug sliding fit with the guide elements and the latter are here shown in the form of tubular elements 18 extending through openings in the supporting member and detachably secured therein. Preferably each such tubular element has its lower portion slightly larger than the opening in the supporting member and has its upper part screw threaded, as shown at 19, and extending beyond the upper surface of the supporting member where it is provided with a nut by means of which it may be rigidly but detachably secured to the supporting member. The springs may be connected with the tubular elements in any suitable manner but, in the present instance, that portion of each tubular element which is below the supporting member is provided with spiral grooves in which the upper windings of the spring 15 are seated. The springs 15 may be connected with the valve stems in any suitable manner and the means utilized for this purpose in the present instance is such as to connect each spring with the inner part 11 of its valve stem and to also connect the latter with the outer part of the valve stem. For this purpose a tubular element 21 is rigidly secured to the upper end of the inner part of the valve stem, as by cotter pins 21a, and projects beyond the same to receive the lower end of the outer part of the valve stem, the latter being preferably kerfed at 22 to provide a snug frictional fit of the same within the tubular element 21 but permitting the same to be readily inserted in and removed from that element. The tubular element 21 is also provided with spiral grooves in which are seated the lower windings of the spring. Thus it will be apparent that the spring acts directly upon that portion of the valve stem which is connected with the valve member 10 and that the outer part of the valve stem is so connected with the inner part that the two will move in unison.

The valve stems may be actuated against the action of the tension springs 15, to open the valve members, in any suitable manner and there is here shown for that purpose an actuating mechanism which in its main features of construction is similar to the actuating mechanism of the aforesaid Schoettinger and Oweger patent. This actuating mechanism comprises a rotatable member 23, here shown as a circular plate, which is mounted about the stud 16 above the supporting member 14 and is capable of rotation about the axis of that stud and for movement lengthwise of the stud. As here shown, the member 23 is provided with a hub 23a slidably mounted on the stud 16 and a spring 23b yieldably supports the actuating member 23 normally in an elevated position. This rotatable member is provided with a plurality of depending lugs, one of which is shown at 24, which are adapted to be moved, by the rotation of the rotatable member, into operative relation with selected valve stems, so that one or more of the valve stems will be actuated upon each downward movement of the rotatable actuating member 23. This rotatable member is provided in its upper surface with bearings 25 arranged on opposite sides of the stud 16 and in these bearings are journaled trunnions 26 which are rigidly secured to the respective arms of a bifurcated handle 27. Each trunnion is provided on its upper portion with a cam surface 28 arranged beneath and acting on a collar 29 rigidly secured to the stud 16 by a nut 29a. It follows therefore that when the actuating handle 27 is rotated about the axis of the stud 16 the actuating member 23 will be moved into operative relation to certain of the valves, as determined by the rotary movement of the actuating member, and that when the handle is moved about its transverse axis the action of the cam-shaped trunnions against the collar 29 will force the actuating member 23 downwardly and thereby move the selected valve stems against the action of their springs.

An indexing device is provided to accurately locate the actuating member in operative relation to the selected valve stems, and this indexing device also serves as a lock which will prevent the downward movement of the actuating member when the latter is not in proper operative relation to any of the valve stems. The actuating member 23 may have any suitable number of operative positions, in which it will be in operative relation to one or more of the valve stems, and, in the present instance, it has three such operative positions. Mounted on the valve casing and extending upwardly alongside of but spaced from the stud 16 is a rod 30, and mounted on the upper end of this rod is a short sleeve 31. The actuating member 23 is provided with three openings 32 so arranged that when the actuating member is in any one of its three predetermined operative positions one or the other of the openings 32 will be in line with the rod 30. That rod is of a diameter smaller than the openings 32 and the sleeve 31 is of a diameter slightly greater than the diameter of the openings and is provided at its upper end with a reduced or beveled portion 33 which may enter the openings and will seat against the lower edge of the openings. A spring 34 presses the sleeve 31 upwardly with relation to the rod 30 so that it is held normally in contact with the lower surface of the actuating member 23 and when that member is rotated to bring an opening 32 into line with the rod and sleeve the reduced end portion of the sleeve will enter the opening and slightly resist the further rotation of the actuating member, thus indicating to the operator that the actuating member is in a proper operative position. However, when it is desired to move to another operative position a slight rotative pressure on the actuating member will force the sleeve downwardly and out of the opening, due to the beveled upper end of the sleeve. When the sleeve is properly seated in any one of the openings 32 the actuating member is free to move downwardly, the sleeve moving with the actuating member and the rod 30 entering the opening in the actuating member as the latter moves downwardly. If it is attempted to move the actuating member downwardly when none of the openings 32 is in line with the sleeve and rod the sleeve will be forced downwardly a slight distance and the actuating member will then engage the upper end of the rod 30 and will be positively held against further downward movement, so that the actuating member cannot be caused to actuate any of the valve stems unless it is in one of its three predetermined selecting positions. The slight downward movement which may be imparted to the actuating member 23 when it is in an inoperative position will not affect the valve stems because the lugs 24 of the actuating member are normally spaced a slight distance from the upper ends of the valve stems, which not only permits the free rotation of the actuating member with relation to the valve stems but also provides the actuating member with a slight lost motion during which it will engage the rod 30, if the actuating member is not in a selecting position. The actuating member 23 may, if desired, be also provided with lugs 35 so arranged that when the actuating member is rotated to the limit of its movement in either direction one or the other of the lugs 35 will engages the sleeve 31 and stop the rotation of the actuating member in one of its operative positions, thus enabling the actuating member to be very quickly adjusted to either of its extreme positions.

The operating mechanism here illustrated may be very quickly and easily assembled and disassembled. To disassemble the apparatus the nuts 20 on the upper tubular elements 18 are loosened sufficiently to relieve the tension on the springs 15 and permit the cotter pins 21a to be withdrawn, thereby disconnecting the lower tubular elements 21 from the lower portions of the respective valve stems, and the nut 29a is removed from the upper end of the stud 16. Thus the actuating device may be removed from the stud and the supporting member and spring assembly may be removed as a unit.

The various pipes are connected to the respective chambers in the valve casing 1 by means of unions 36 and the inner threaded elements 37 of the unions are preferably formed integral with the casing itself, thus eliminating the joint between the union and the casing and enabling the individual pipes to be very quickly and easily connected with and disconnected from the casing.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In a valve mechanism comprising a casing, and a valve member in said casing, a supporting member mounted in fixed relation to said casing and spaced therefrom, a tubular element mounted in said supporting element, a stem connected with said valve member and extending through said tubular element, a connecting element secured to said valve stem between said tubular element and said casing, a coiled spring mounted about said valve stem and connected at its respective ends with said tubular element and said connecting element, means for securing said tubular element in said supporting element and adjusting the same with relation thereto to control the tension of said spring, and means arranged on that side of said supporting member opposite said spring for moving said valve stem against the action of said spring.

2. In a valve mechanism comprising a casing and a valve member in said casing, a supporting member fixed with relation to said casing and having a guideway spaced from said casing, a two part valve stem having an inner part connected with said valve member, and an outer part detachably connected with said inner part and extending through said guideway, a spring detachably connected at one end with said inner part of said valve stem and connected at its other end with said supporting member, and means acting on the outer part of said valve stem to move the valve stem as a whole against the action of said spring.

3. In a valve mechanism comprising a casing and a valve member in said casing, a supporting member fixed with relation to said casing, a tubular element extending through said supporting member and spaced from said casing, means for detachably securing said tubular element to said supporting member, a valve stem having an inner part connected with said valve member and a separate outer part slidably mounted in said tubular element, a second tubular element secured to said inner part of said valve stem and extending beyond the same to receive the adjacent end of said outer part of said valve stem, a spring connected at its ends with the respective tubular elements and means acting on said outer part of said valve stem to move the valve stem as a whole against the action of said spring.

4. In a multiple valve comprising a casing having a plurality of valve chambers, a valve member in each valve chamber, stems connected with the respective valve members and extending beyond the wall of said casing, and an actuating device mounted in spaced relation to said casing and having means for actuating said valves; a supporting member fixed with relation to said casing, springs arranged about the respective valve stems, means for connecting one end of each spring with its valve stem and normally stationary means between said actuating device and said casing for connecting the other ends of said springs with said supporting member, said normally stationary means being operable to control the tension of the springs.

5. In a multiple valve comprising a casing having a plurality of valve chambers, a valve member in each chamber, stems connected with the respective valve members and extending beyond the wall of said casing, and an actuating device mounted in spaced relation to said casing and having means for actuating said valves; a supporting member mounted between said actuating device and said casing in fixed relation to the latter, said supporting member being spaced from said casing and having a plurality of openings through which the respective valve stems extend, springs arranged about said valve stems between said supporting member and said casing, and means for connecting one end of each spring with one of said valve stems and connecting the other end thereof with said supporting member.

6. In a multiple valve comprising a casing having a plurality of valve chambers, a valve member in each chamber, stems connected with the respective valve members and extending beyond the wall of said casing, and an actuating device mounted in spaced relation to said casing and having means for actuating said valves; a supporting member mounted between said actuating device and said casing in fixed relation to the latter, said supporting member being spaced from said casing and having a plurality of openings through which the respective valve stems extend, springs arranged about said valve stems between said supporting member and said casing, means for connecting those ends of said springs adjacent to said casing with the respective valve stems, and means carried by said supporting member for connecting the other ends of said springs therewith, the last mentioned means being operable to control the tension of said springs.

7. In a multiple valve comprising a casing having a plurality of valve chambers, a valve member in each chamber, stems connected with the respective valve members and extending beyond the wall of said casing, and an actuating device mounted in spaced relation to said casing and having means for actuating said valves; a supporting member mounted between said actuating device and said casing in fixed relation to the latter, said supporting member being spaced from said casing and having a plurality of openings, tubular members mounted in said openings to receive and guide the respective valve stems, springs arranged about the respective valve stems between said supporting member and said casing and connected at one end with the respective tubular members, means for connecting the other end of said springs with said valve stems, and means for securing said tubular members to said supporting member and for releasing the same for movement lengthwise of said valve stems to relieve the tension of said springs.

8. In a multiple valve comprising a casing having a plurality of valve chambers and a valve member mounted in each valve chamber, an elongate stud mounted on said casing, a supporting member mounted on said stud in spaced relation to said casing and having a plurality of openings, a valve stem connected with each valve member and extending through one of the openings in said supporting member, springs arranged between said supporting member and said casing, each spring being connected at one end with one of said valve stems and at its other end with said supporting member, and an actuating device mounted on said stud for movement into operative relation to selected valve stems, and having means for moving the selected valve stems against the action of their springs.

9. In a multiple valve comprising a casing having a plurality of valve chambers and a valve member mounted in each valve chamber, an elongate stud mounted on said casing, a supporting member removably mounted on said stud in spaced relation to said casing, a plurality of guide elements detachably secured to said supporting member, a two part valve stem for each valve member including an inner part connected with its valve member and an outer part slidably mounted in one of said guide elements and detachably connected with the inner part of said valve stem, a spring associated with each valve stem and connected at one end with the inner part of said valve stem and at its other end with said supporting member, and means removably mounted on said stud for selectively actuating said valve stems.

10. In a multiple valve comprising a casing having a plurality of valve chambers and a valve member in each chamber, a supporting member mounted in spaced relation to said casing, valve stems connected with the respective valve members and extending beyond said supporting member, a spring connected with each valve stem and with said supporting member, an actuating device mounted beyond said supporting member for movement into operative relation to selected valve stems and having a plurality of recesses, and an indexing device having a part yieldably engaging said actuating device and adapted to enter said recesses and accurately position said actuating device with relation to the selected valve stems.

11. In a multiple valve comprising a casing having a plurality of valve chambers and valve members in the respective valve chambers, a supporting member mounted in spaced relation to said casing, valve stems connected with the respective valve members, a spring connected with each valve stem and with said supporting member, an actuating device including a member rotatable into operative relation to selected valve stems and having a plurality of openings, and means for moving said rotatable member in the direction of its axis to actuate the selected valve stems, a rod fixed with relation to said actuating device, arranged beneath said rotatable member and adapted to extend through the openings in said rotatable member, a sleeve slidably mounted on said rod and having a reduced end portion adapted to enter said openings, and a spring pressing said sleeve against said rotatable member, whereby when said sleeve is seated in one of said openings and said rotatable member is moved axially said rod will extend through said opening, and when said sleeve is not seated in one of said openings said rod will be in the path of an unperforated portion of said rotatable member and will prevent any substantial axial movement thereof.

GEORGE SCHOETTINGER.
LEO OWEGER.